(No Model.)
B. ROUX.
CASTER.
No. 301,925. Patented July 15, 1884.
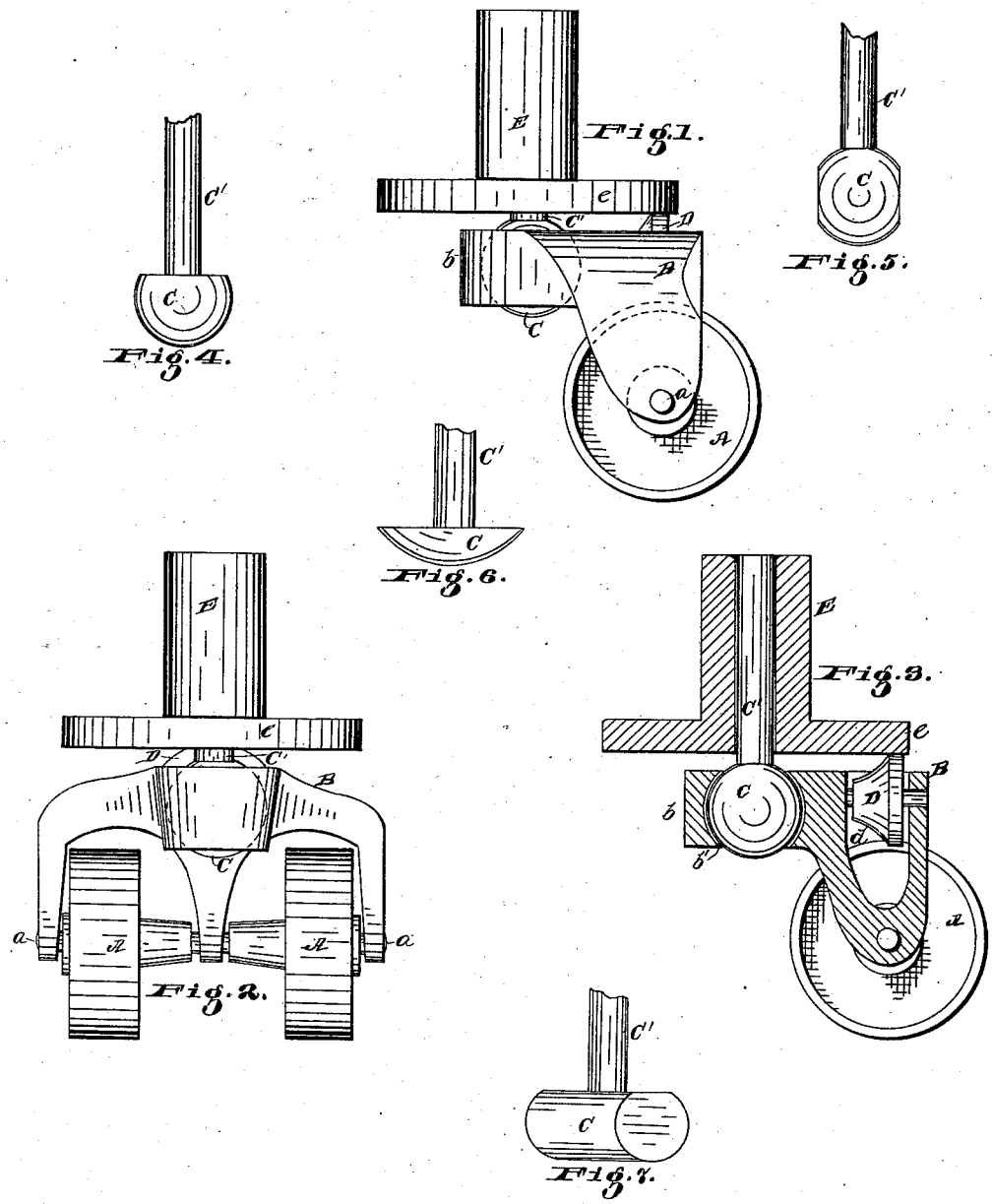
ATTEST.
Walter Chamberlin
J. Wm. Strebli
INVENTOR.
Benoit Roux,
per Wm. Hubbell Fisher,
Atty.

UNITED STATES PATENT OFFICE.

BENOIT ROUX, OF CINCINNATI, OHIO.

CASTER.

SPECIFICATION forming part of Letters Patent No. 301,925, dated July 15, 1884.

Application filed June 12, 1883. (No model.)

*To all whom it may concern:*

Be it known that I, BENOIT ROUX, of the city of Cincinnati, in the county of Hamilton and State of Ohio, have invented certain new and useful Improvements in Casters, of which the following is a specification.

My invention is especially designed for use in connection with furniture, but may be used for any of the purposes for which a caster can be employed. For example, the caster can be used for trucks of various descriptions.

The nature of my invention and its various advantages will be apparent from the drawings and the following description and claims.

Referring to the drawings forming part of this specification, Figure 1 is a side elevation of the caster. Fig. 2 is a rear elevation of the same. Fig. 3 is a vertical central section of the same, taken at the line $xx$ of Fig. 2. Figs. 4, 5, 6, and 7 represent modifications of a certain portion of my invention.

I employ one or two main or floor wheels, A, which are suitably journaled in a frame or yoke, B. For most purposes for which such casters are employed two such wheels are desirable, and hence in the drawings I have shown the caster as provided with two such wheels, a journal-shaft, $a$, passing through said yoke and the wheels.

The yoke B is made of a suitable metal, preferably of cast-iron or brass, and the wheels may also be made of any suitable material. At the back of the yoke B is formed a socket, $b$, which incloses and supports the end C of the shank C', which end C is of a globular or other form. When the yoke is to be cast, the head C is placed in the mold in which the yoke B is cast, and the yoke is then cast around the head C, and in this manner a ball-and-socket joint is formed between the yoke B and the shank C'.

In the upper front portion of the yoke B is formed a recess, $d$, in which recess is journaled a friction-roller, D, the axis of rotation of said roller being preferably at right angles to the shaft $a$, and the periphery of the roller D, when in position, projecting slightly above the upper face of the yoke B, to receive the edge of the flange $e$ of the cap E. The shank C' is preferably made of wrought-iron, and is surrounded by a bushing or cap, E, the upper end of the shank being riveted to prevent the bushing from coming off from the shank. This shank is, however, free to turn in the cap E. The lower end of the cap E is formed into or provided with a circular disk or flange or plate of suitable shape, $e$, the diameter of which is such that it will extend beyond the friction-roller D, upon which said flange rests, substantially as shown. The bushing or cap E is to be secured in or to the article which is to be supported by the caster, and the shank C' being free to turn in said cap, and the head or ball C being also free to turn in the socket $b'$ in the yoke, a double joint is made between the yoke and the bushing, which greatly lessens the friction, and the shank C' being connected to the yoke B by a ball-and-socket joint, the yoke is free to tilt in any direction to accommodate the rollers or wheels A to any inequalities in the floor or surface over which the caster is to pass, and the caster will thus move easily over the surface, although the surface may be somewhat uneven, and by the ball-and-socket connection between the shank and the yoke B, (the shank being free to turn in the bushing or cap E,) the yoke turns very easily.

Casters made according to my invention are much cheaper of manufacture than the non-friction casters heretofore made, work with much less friction, and are more substantial and durable.

The head C of the shank C' is preferably globular, but may be of any suitable shape which allows the shank to oscillate, as respects the yoke, in a direction parallel to the plane of the axis of the main wheel or wheels A. Some suitable forms of said head are shown in Figs. 4, 5, 6, and 7; but where the head is globular or semi-globular, the lower portion at least being globular, the shank and yoke are free to oscillate in respect to each other in any direction. Such a globular form is preferable.

Preferably for most purposes for which casters are used, the top of the socket overlaps a part of the head of the shank and prevents the latter from being retracted.

The various features of my invention are preferably employed together; but one or more of them may be employed without the remainder, and, when desired, one or more of said features may be employed, so far as applicable, in connection with casters other than that specifically hereinbefore set forth.

What I claim as new and of my invention, and desire to secure by Letters Patent, is—

1. In a non-friction caster, the main wheel, yoke, or housing having the socket receiving and supporting and inclosing the head of the shank, the said head being globular, or shaped substantially as specified, and fitted into and inclosed by the socket, and capable of oscillating therein, but so as not to be withdrawn in either direction when in use as a caster, substantially as and for the purposes specified.

2. In a non-friction caster, the socket or housing supporting and inclosing the ball or curved head of the shank, said socket or housing being cast around the said ball or head, the latter being free to oscillate therein, substantially as and for the purposes specified.

BENOIT ROUX.

Attest:
 J. WM. STREHLI,
 WALTER CHAMBERLIN.